United States Patent [19]

Ninomiya

[11] 4,081,826
[45] Mar. 28, 1978

[54] VIDEO TIME BASE CORRECTOR
[75] Inventor: Takeshi Ninomiya, Tokyo, Japan
[73] Assignee: Sony Corporation, Tokyo, Japan
[21] Appl. No.: 684,488
[22] Filed: May 10, 1976
[30] Foreign Application Priority Data
  May 15, 1975 Japan .................... 50-58317
[51] Int. Cl.² ............... H04N 5/76; H04N 5/78; H04N 5/78
[52] U.S. Cl. ........................... 358/8; 360/36; 360/38
[58] Field of Search ............... 358/8, 17; 360/36, 38
[56] References Cited
U.S. PATENT DOCUMENTS
3,860,952  1/1975  Tallent et al. ................ 358/8
3,909,839  9/1975  Inaba et al. .................. 358/8

Primary Examiner—Robert L. Griffin
Assistant Examiner—Aristotelis M. Psitos
Attorney, Agent, or Firm—Lewis H. Eslinger; Alvin Sinderbrand

[57] ABSTRACT

In a time base corrector which converts incoming video signals to digital form and writes the digitized signals in a memory at a clocking rate varying generally in accordance with time base errors in the incoming signals, whereupon the signals temporarily stored in the memory are read out or fetched therefrom at a standard clocking rate and reconverted to analog form for eliminating the time base errors; the memory is composed of a plurality of cyclically enabled memory units which each have a capacity to store an even number of line intervals of the video signals.

6 Claims, 4 Drawing Figures

VIDEO TIME BASE CORRECTOR

BACKGROUND OF THE INVENTION

1. Field of the Invention

This invention relates to the processing of periodic information signals, such as, video signals, and more particularly is directed to apparatus by which time base errors introduced during recording and/or reproducing of such signals may be removed.

2. Description of the Prior Art

Video signals are frequently recorded on magnetic tape and subsequently reproduced for later broadcasting or viewing purposes. During the reproduction of recorded video signals, time base or frequency errors are usually introduced by reason of expansion or contraction of the record medium during or after recording, variation in the speed of the tape relative to the magnetic head or heads during recording or reproduction, variation between the tape recording speed and the tape reproducing speed, and the like. The presence of such time base errors in the reproduced video signals cause a frequency shift of the latter which can result in many observable undesirable effects, particularly when the reproduced video signals are to be transmitted or broadcast and may be mixed with live broadcast material that do not have such time base errors. The observable undesirable effects resulting from relatively small time base errors are a smeared or jittery picture with erroneous intensity variations and, in the case of color video signals, improper color display. When the time base errors are large, the reproduced picture will fail to lock horizontally or vertically.

In an existing time base corrector for substantially removing time base errors from video signals, for example, as disclosed in U.S. Pat. No. 3,860,952, issued Jan. 14, 1975, the incoming video signals are converted from analog to digital form and temporarily stored in a memory. Time base errors are removed from the video signals by writing the digitized signals in the memory at a clocking rate which varies in a manner generally proportional to the time base errors, and by fetching or reading out these stored signals at a standard clocking rate. After such reading out of the digitized video signals, the latter are reconverted to analog form and applied to an output terminal. The memory used in the known time base corrector comprises a plurality of memory units each capable of storing a plurality of horizontal lines of video information. A sequence control unit controls the selection of each memory unit for writing and reading so that the sampled video information is sequentially stored by cyclically enabling the plurality of memory units and serially storing one or more lines of digitized video information in each selected memory unit, and further so that, contemporaneously with the storage of sampled video information in a selected memory unit, and sequence control unit enables the video information stored in a different one of the memory units to be sequentially fetched or read out therefrom, with the enabling of the memory units for the reading out of the information stored therein being also effected in a cyclical manner.

Further, it has been proposed that, in a time base corrector as described above, those line intervals of the incoming video signals in which dropouts occur should be omitted from the output of the time base corrector and replaced by previously stored line intervals of similar video information.

However, problems are encountered in the above described time base correctors, particularly when used for correcting time base errors in NTSC color video signals. More particularly, as is well known, the polarity or phase of the chrominance subcarrier is reversed for successive horizontal or line intervals of NTSC color video signals. Therefore, if the time base corrector is designed, as described above, so as to compensate for dropout by substituting for the line interval or intervals containing dropout, a previously stored line interval or intervals of similar video information, the chrominance subcarrier of each substituted line intervals of video information in the output has to have the same polarity or phase as the chrominance subcarrier of the replaced line interval. Thus, the time base corrector requires a relatively complicated circuit arrangement for detecting the phase or polarity of the chrominance subcarrier and for controlling the phase or polarity of the chrominance subcarrier in the output from the time base corrector so as to ensure that the same is reversed for successive line intervals even when compensating for drop out in the incoming video signals.

Furthermore, in time base correctors, as described above, the time base error of the incoming video signals is usually detected from the burst signals of the latter. Therefore, the frequency of the write clock pulse signal modulated by the time base error, that is, the frequency at which the digitized signals are sampled for writing in the memory, is selected to be a whole multiple of the burst or chrominance subcarrier frequency $f_c$ which, in the case of NTSC color video signals, is about 3.58 MHz. It is also necessary that the write clock pulse frequency be in interleaving relation to the horizontal or line frequency $f_h$ of the incoming video signals which is 15.75 KHz in the case of NTSC color video signals. Such interleaving relation is achieved when the write clock pulse frequency is $(2n-1)/2 \times f_h$, in which $n$ is any desired integer. However, since the burst frequency 3.58 MHz of an NTSC color video signal is 15.75 KHz $\times \frac{1}{2} \times 455$, the interleaving relation of the write clock pulse frequency to the horizontal or line frequency can be achieved when the write clock pulse frequency is selected to be $(2N-1) \times f_c$, in which N is any desired integer. Thus, for example, when the write clock frequency is 10.74 MHz, that is, $3 \times f_c$ for NTSC signals, the incoming video signals are sampled 682.5 times during each horizontal or line interval thereof. This means that, in alternate horizontal or line intervals of the incoming video signals, 682 and 683 words are respectively written in the memory units which are selectively enabled for the writing operation. The different number of words to be stored in the memory units during successive line intervals of incoming NTSC color video signals may result in complexity of the sequence control unit for controlling the writing and reading operations.

OBJECTS AND SUMMARY OF THE INVENTION

Accordingly, it is an object of this invention to provide a time base corrector of the type described above, and in which time base errors may be removed from video or other periodic information signals without the above mentioned problems encountered in the prior art.

More specifically, it is an object of this invention to provide a time base corrector of the described type which facilitates sequential control of the writing of the video or other periodic information in the several units of the memory and of the reading out of such stored information notwithstanding the fact that such information may be comprised of different numbers of words for the alternately occurring lines or other periodic intervals of the incoming signals.

Another object is to provide a time base corrector, as aforesaid, which is further operative to remove any dropouts occurring in incoming NTSC color video signals without regard to the reversal of phase or polarity of the chrominance subcarrier of such signals for successive line intervals thereof.

In accordance with an aspect of this invention, in a time base corrector which converts incoming video or other periodic information signals to digital form and writes the digitized signals in a memory at a clocking rate varying generally in accordance with time base errors in the incoming signals, whereupon the signals temporarily stored in the memory are read out or fetched therefrom at a standard clocking rate and reconverted to analog form for eliminating the time base errors; the memory is composed of a plurality of cyclically enabled memory units which each have a capacity to store an even number of line or other periodic intervals of the video signals. Therefore, even though alternate lines of the video signals, as written, may be comprised of different numbers of words, each memory unit will have the same number of words to be written therein and to be fetched therefrom for facilitating the sequence control of the memory. Further, by storing an even number of line intervals of video information in each of the memory units, line intervals in which a dropout is detected can be conveniently replaced in the output from the time base corrector by other stored line intervals of similar information which is free of dropout even though, as in the case of NTSC color video signals, the alternate line intervals have chrominance subcarriers with different phases or polarities.

The above, and other objects, features and advantages of the invention, will be apparent in the following detailed description of an illustrative embodiment which is to be read in conjunction with the accompanying drawings.

DESCRIPTION OF A PREFERRED EMBODIMENT

Figure 1:
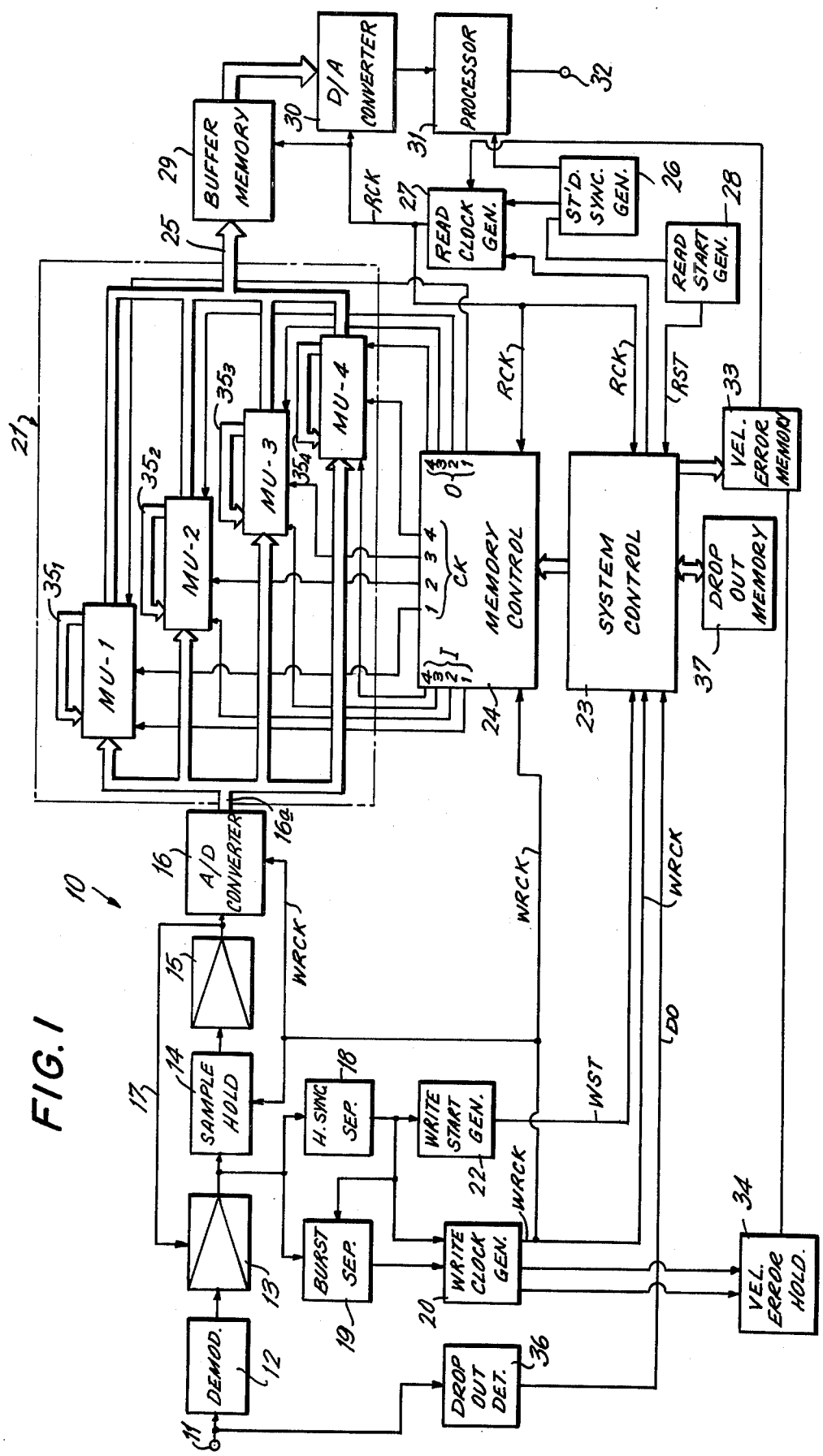
FIG. 1 is a schematic block diagram of a time base corrector according to an embodiment of this invention.

Referring to the drawings in detail, and initially to FIG. 1 thereof, it will be seen that a time base corrector 10 to which this invention may be applied has an input terminal 11 for receiving periodic information signals, such as composite color video signals reproduced by a so-called VTR and having time base errors. If the reproduced composite color video signals applied to terminal 11 are not already in the standard NTSC form, such signals are applied to a demodulator 12 which may include an NTSC encoder. The resulting NTSC color video signals are applied through a buffer amplifier 13 to a sample-hold circuit 14 and from the latter through an amplifier 15 to an analog-to-digital (A/D) converter 16. As shown, a D.C. restoring loop 17 is provided between amplifiers 13 and 15 so that the NTSC color video signals are sampled in D.C. restored form.

The D.C. restored NTSC color video signals issuing from amplifier 13 are further applied to a separator 18 which separates horizontal synchronizing signals therefrom, and to a separator 19 which is gated by the separated horizontal synchronizing signals so as to separate burst signals from the NTSC color video signals. The separated horizontal synchronizing signals and burst signals are applied to a write clock generator 20 which, as is known, produces write clock pulses WRCK having a relatively high frequency, for example, of about 10.74 MHz which is three times the color or chrominance subcarrier frequency $f_c$ for NTSC signals, and with their frequency or repetition rate being varied in accordance with changes in the frequency of the subcarrier burst signals extracted from the incoming color video signals so as to closely follow, or be dependent upon time base errors in such incoming signals.

Further, it will be seen that the write clock pulses WRCK issuing from generator 20 and having a frequency of approximately 10.74 MHz are applied to A/D converter 16 and to sample-hold circuit 14 to control the rate at which the latter samples the demodulated or detected video signals and the rate at which converter 16 converts the sampled signals from their original analog form into digital form. More specifically, in response to each write clock pulse from generator 20, A/D converter 16 is operative to sample the demodulated video signal and convert the latter into a plurality of parallel bit signals, for example, digital information of eight parallel bits. In the case of NTSC color video signals having a horizontal or line frequency $f_h$ of 15.75 KHz, there will be 682.5 samples or words of digital information for each horizontal or line interval of such video signals when the latter are sampled at the rate of 10.74 MHz, as described above.

The parallel bits of digitized signal information are supplied from converter 16 to a memory 21 by way of a digital information bus 16a which, for ease of illustration, is represented by a double line. The memory 21 is shown to include memory units MU-1, MU-2, MU-3 and MU-4, each of which is comprised of a plurality of shift registers equal in number to the number of parallel bits making up each word of the digitized video signals. Thus, in the example being described, each of the four memory units MU-1, MU-2, MU-3 and MU-4 is made up of eight shift registers.

Figure 2:
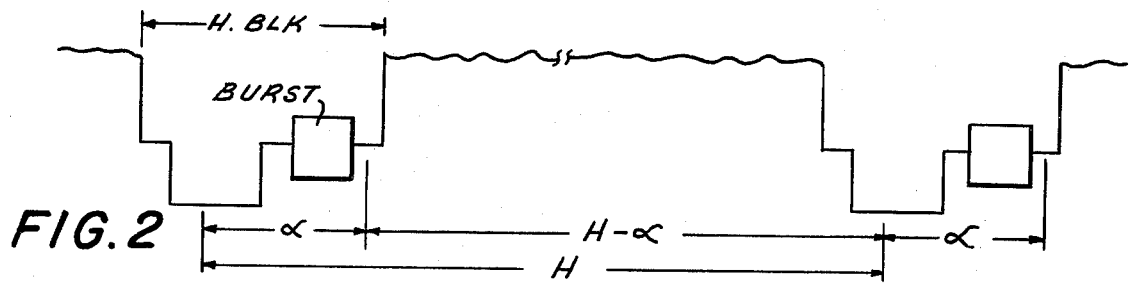
FIG. 2 is a schematic diagram illustrating a color video signal that may be applied to the time base corrector of FIG. 1 for removal of time base errors from such signal.

In accordance with this invention, each shift register of the memory units MU-1, MU-2, MU-3 and MU-4 is selected to have a storage capacity or memory which, in consideration of the frequency of the write clock pulses from generator 20, is sufficient to store the digitized information corresponding to an even number, that is, 2,4,6,8 - - - etc., of the horizontal or line intervals of the incoming video signals. As previously indicated, in the case of NTSC color video signals and a write clock pulse frequency of about 10.74 MHz, there are 682.5 words of digital information for each horizontal or line interval indicated at H on FIG. 2. However, in the time base corrector according to this invention, the horizontal synchronizing signals and burst signals occurring during the interval α in each horizontal blanking period are preferably stripped from the incoming video signals prior to the conversion of the latter digital form so that, for example, only 640 words of digital information need to be accommodated in the registers of memory units MU-1, MU-2, MU-3 and MU-4 for each of the even number of horizontal or line intervals to be stored therein. Thus, if the digital information corresponding to two horizontal or line intervals is to be stored in each of the memory units MU-1, MU-2, MU-3 and MU-4, the registers of such memory units have to have capacities for 1280 words corresponding to the sampling in the period 2H-2α, as indicated on FIG. 3.

The separated horizontal synchronizing signals are further shown to be applied to a write start generator 22 which produces a write start pulse WST, for example, at the beginning of every second horizontal or line interval of the incoming video signals in the case where digital information corresponding to two horizontal or line intervals is to be stored in each of the memory units.

The write start pulses WST from generator 22, and the write clock pulses WRCK from generator 20 are applied to a system control circuit 23 which controls the operations of a memory control circuit 24 for effecting the selective writing and reading operations of the memory units MU-1, MU-2, MU-3 and MU-4. More particularly, under normal circumstances, system control circuit 23 causes memory control circuit 24 to produce write control signals $I_1$, $I_2$, $I_3$ and $I_4$ occurring in a repeating cyclic order and which are respectively applied to the memory units MU-1, MU-2, MU-3 and MU-4 in order to determine the sequences in which such memory units are selected or enabled for the writing, in the selected memory unit, of the digitized information corresponding to two, or any other even number of horizontal or line intervals of the incoming video signals. Further, the memory control 24 receives the write clock pulses WRCK from generator 20 and, during the writing period determined by the write control signal $I_1$, $I_2$, $I_3$ or $I_4$, the memory control 24 supplies the write clock pulses WRCK from one of its clock outputs $CK_1$, $CK_2$, $CK_3$ and $CK_4$ to the respective memory unit MU-1, MU-2, MU-3, or MU-4 which is then selected ro enabled for writing, so that the digitized information corresponding to two horizontal or line intervals of the video signals is written in the shift registers of the selected memory unit at the clocking rate determined by the frequency of the write clock pulses WRCK which varies in accordance with time base errors in incoming video signals.

After momentary storage in memory units MU-1, MU-2, MU-3 and MU-4, the digitized video signal information is read out therefrom in a predetermined sequence, as hereinafter described in detail, to an information or data bus 25. In order to determine the clocking rate at which the digitized information is read out of each of the memory units, the illustrated time base corrector 10 includes a standard sync generator 26 which supplies a carrier signal at a fixed or standard frequency, for example, the standard chrominance subcarrier frequency $f_c$ of 3.58 MHz for NTSC color video signals, to a read clock generator 27 which, in turn, produces read clock pulses RCK at a standard frequency, for example, 10.74 MHz., at least at the beginning and end of each reading period. The carrier signal at a fixed or standard frequency is further shown to be applied to a read start generator 28 which produces a read start pulse RST, for example, at intervals corresponding to two horizontal or line intervals for NTSC video signals.

The read start pulses RST from generator 28 are applied to system control circuit 23, and the read clock pulses RCK are applied from generator 27 to system control circuit 23 and memory control circuit 24. Under normal circumstances, system control circuit 23 causes memory control circuit 24 to produce read control signals $O_1$, $O_2$, $O_3$ and $O_4$ occurring in a repeating cyclic order and which are respectively applied to memory units MU-1, MU-2, MU-3 and MU-4 in order to determine the sequence in which such memory units are selected or enabled for the reading out therefrom of the digitized information corresponding to two, or any other even number of horizontal or line intervals, which had been previously stored in the selected memory unit. Further, during each reading period determined by the read control signal $O_1$, $O_2$, $O_3$ or $O_4$, the memory control circuit 24 supplies the read clock pulses RCK from a respective one of its clock outputs $CK_1$, $CK_2$, $CK_3$ and $CK_4$ to the selected or enabled memory unit, so that the digitized information corresponding to two horizontal or line intervals of the video signals is read out of the shift registers of the selected memory unit at the standard clocking rate of the read clock pulses RCK.

The read clock pulses RCK are also applied to a buffer memory 29, which receives the digitized information sequentially read out of memory 21, and to a digital-to-analog (D/A) converter 30 which is operative to convert the buffered digital output of memory 29 back to the original analog form. The analog output of D/A converter 30 is applied to a processor 31 which receives the standard frequency carrier signal from generator 26, and which is operative to add to the output of converter 30 the color burst and composite synchronizing signals which were previously stripped from the incoming video signals. The resulting composite color video signals are then obtained at an output terminal 32 of processor 31.

In order to correct for velocity errors that may appear in the incoming video signals, the time base corrector 10 to which this invention is applied may further detect the velocity error at the write clock generator 20 during each writing period and then supply the detected velocity error to a velocity error memory 33 by way of a velocity error hold circuit 34. The velocity error memory 33, under the control of system control circuit 23, memorizes the velocity error detected during the writing period of each of the memory units MU-1, MU-2, MU-3 and MU-4, and, during the reading period of each of the memory units, applies a corresponding velocity error correcting signal to read clock generator 27 by which the read clock pulses RCK from the latter are suitably modulated to eliminate or compensate for the velocity errors. Thus, the read clock pulses RCK, while having the standard frequency at the beginning and end of each reading period, may vary during such reading period.

In any event, it will be apparent that, in the time base corrector 10, as described above, successive line intervals of the incoming video signals are written in memory 21 at a clocking rate which varies generally in accordance with the time base errors of the incoming signals, and that the video signals are read out from memory 21 at a standard clocking rate so that the video signals obtained at output terminal 32 have any time base errors removed therefrom.

Further, in the time base corrector 10 to which this invention is applied, the memory units MU-1, MU-2, MU-3 and MU-4 are preferably provided with recycle loops $35_1$, $35_2$, $35_3$ and $35_4$, respectively, so that upon the occurrence of the read control signal $O_1$, $O_2$, $O_3$ or $O_4$ for causing reading out of the digital information stored in a memory unit, the information being read out from the selected memory unit is simultaneously applied through the respective recycle loop to the input of the selected memory unit so as to be rewritten in the latter. The foregoing arrangement is shown to be provided in association with a dropout detector 36 which is connected with input terminal 11 for detecting any dropout in the incoming video signals and providing a corresponding dropout signal DO to the system control circuit 23, and with a dropout memory 37 in which information concerning the occurrence of dropout in the incoming video signals is stored for influencing the writing and reading sequences of the memory units so as to eliminate such dropout from the time base corrected video signals obtained at output terminal 32.

Figure 3:
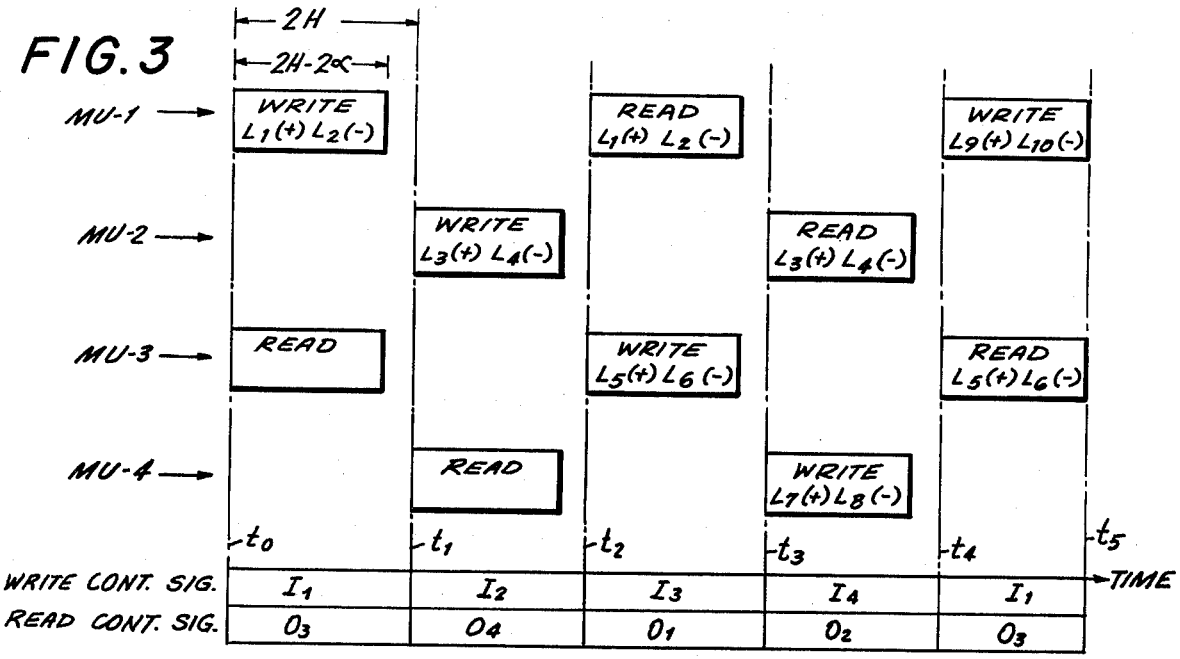
FIG. 3 is a timing chart showing the cyclic orders in which signal information may normally be written in, and read out of, the several memory units of the time base corrector of FIG. 1.

Referring now to FIG. 3, it will be seen that, in a time base corrector embodying this invention, the cyclically occurring write control signals $I_1$, $I_2$, $I_3$ and $I_4$ for sequentially writing digital information corresponding to two, or any other even number of horizontal or line intervals, in each of the memory units MU-1, MU-2, MU-3 and MU-4 may normally occur simultaneously with the cyclically occurring read control signals $O_3$, $O_4$, $O_1$ and $O_2$, respectively, for sequentially reading out the digital information previously stored in the respective memory units MU-3, MU-4, MU-1 and MU-2, respectively. Thus, in the successive time periods $t_0$-$t_1$, $t_1$-$t_2$, $t_2$-$t_3$, $t_3$-$t_4$, $t_4$-$t_5$, - - - etc., digital informations corresponding to line intervals $L_1$ and $L_2$, $L_3$ and $L_4$, $L_5$ and $L_6$, $L_7$ and $L_8$, $L_9$ and $L_{10}$, - - - etc., are written sequentially in memory units MU-1, MU-2, MU-3, MU-4, MU-1, - - - etc. Correspondingly, the digital informations representing line intervals $L_1$ and $L_2$, $L_3$ and $L_4$, $L_5$ and $L_6$, - - - etc. are read out of the respective memory units MU-1, MU-2, MU-3 - - - etc., during the time intervals $t_2$-$t_3$, $t_3$-$t_4$, $t_4$-$t_5$, - - - etc.

Since each memory unit stores digital information corresponding to an even number of horizontal or line intervals of the video signals, no problem is encountered in controlling the writing and reading operations even if, as in the case of NTSC color video signals, the frequency of the write clock pulses modulated by the time base errors results in the digital information representing each add numbered line interval, such as, the line intervals $L_1$, $L_3$, $L_5$, $L_7$, $L_9$, containing a different number of words than the digital information representing each even numbered line interval, such as, the line intervals $L_2$, $L_4$, $L_6$, $L_8$, $L_{10}$. In other words, since each memory unit has an equal number of odd and even numbered line intervals stored therein, the digital informations stored in all of the memory units contain the same numbers of words.

Figure 4:
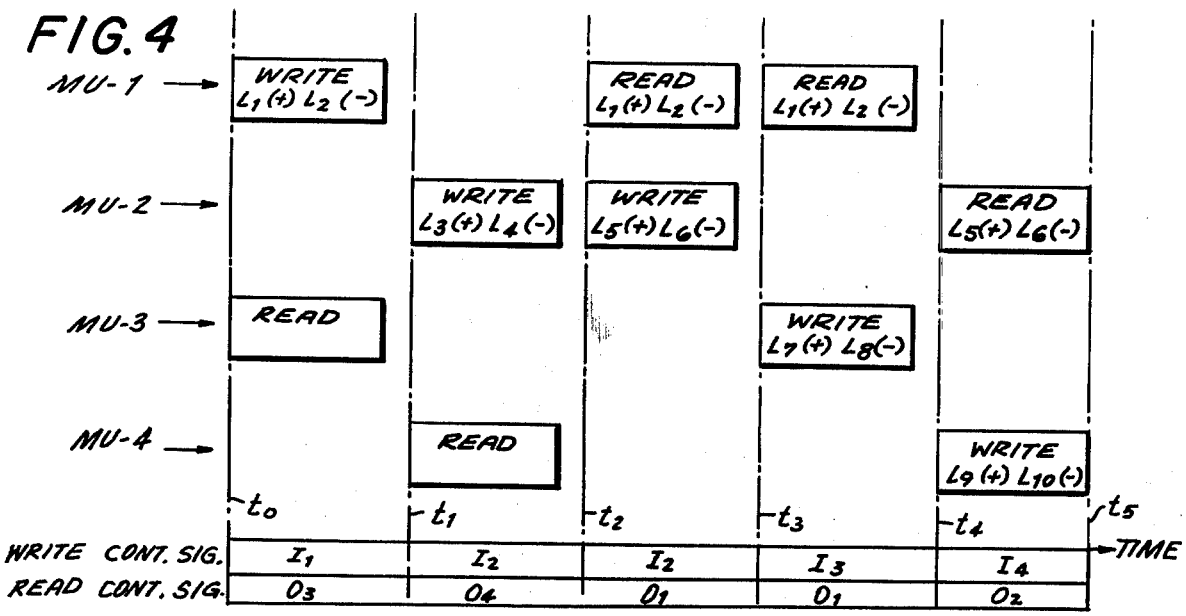
FIG. 4 is a timing chart similar to that of FIG. 3, but illustrating the sequences in which signal information may be written and read when dropout is detected.

Further, by storing digital information representing an even number of horizontal or line intervals in each of the memory units, as in accordance with this invention, changes in the polarity or phase of the chrominance subcarrier for the odd-numbered and even-numbered line intervals of NTSC color video signals, for example, as indicated by the symbols (+) and (−) on FIGS. 3 and 4, do not cause any problems when line intervals of the incoming video signals containing dropouts are replaced, in the time base corrector, by other similar line intervals which are free of dropout, whereby to eliminate dropout from the time base corrected video signals.

Thus, if the present invention is applied to a time base corrector having a dropout compensating arrangement of the type disclosed in detail in U.S. Pat. Application Ser. No. 642,197, filed Dec. 18, 1975, and having a common assignee herewith, the detection of dropout, for example, in one or both of the video signal line intervals $L_3$ and $L_4$ being written in memory unit MU-2 during the time interval $t_1$-$t_2$, may cause the writing period for the memory unit MU-2 to be extended for the time interval $t_2$-$t_3$ during which the information corresponding to line intervals $L_3$ and $L_4$ is driven out of memory unit MU-2 and replaced in the latter by information corresponding to line intervals $L_5$ and $L_6$, assuming that the latter are free of dropout, as shown on FIG. 4. In other words, the sequencing of the write control signals $I_1$-$I_4$ may be inhibited or interrupted in response to detection of dropout. Similarly, the detection of dropout may inhibit the sequencing of the read control signals $O_1$-$O_4$, so that, in the example illustrated on FIG. 4, the reading of the contents of memory unit MU-1 in the time interval $t_2$-$t_3$ is repeated in the next time interval $t_3$-$t_4$. The foregoing is, of course, made possible by the recycle loops $35_1$-$35_4$ which, during the reading of each memory unit, rewrite the information being read in the respective memory unit. Therefore, if dropout occurs in one or both of the line intervals $L_3$ and $L_4$, the output of the time base corrector then represents the video signals for the line intervals $L_1(+)$, $L_2(-)$, $L_1(+)$, $L_2(-)$, $L_5(+)$, $L_6(-)$, $L_7(+)$, $L_8(-)$, - - - etc. Thus, as indicated by the symbols (+) and (−), the alternate line intervals of the corrected output have chrominance subcarriers of reversed phase as is required for NTSC color video signals.

It will be appreciated that, if dropout is similarly compensated in a digital time base corrector in which one, three or some other odd number of line intervals of video information is stored in each memory unit, as specifically disclosed in the prior art, complex circuits have to be provided to ensure that each line interval of video information which is substituted for a line interval containing dropout has a chrominance subcarrier of the same phase as that of the line interval which is replaced.

Although an illustrative embodiment of the invention has been described herein with reference to the accompanying drawings, it is to be understood that the invention is not limited to that embodiment, and that various changes and modifications may be effected therein by one skilled in the art without departing from the scope or spirit of this invention as defined in the appended claims.

What is claimed is:

1. In a time base corrector which converts incoming information signals having periodic signal intervals to digital form and writes the digitized signals in a memory at a clocking rate which is modulated in accordance with time base errors in the incoming signals, whereupon the digitized signals temporarily stored in the memory are read out therefrom substantially at a standard clocking rate and the resulting digitized output from the memory is reconverted to analog form for eliminating the time base errors; said memory comprises a plurality of cyclically enabled memory units each of which stores a quantity of said digitized signals representing an even number of said periodic signal intervals of said information signals.

2. A time base corrector according to claim 1; in which said incoming signals are color video signals, and said periodic signal intervals are horizontal line intervals of said color video signals.

3. A time base corrector according to claim 2; in which said color video signals include composite synchronizing signals and burst signals which are stripped from said color video signals prior to said conversion of the latter to said digital form; and in which each of said memory units has a capacity to store said digitized signals representing an even number of said line intervals stripped of said composite synchronizing signals and said burst signals.

4. A time base corrector according to claim 2; in which said color video signals are NTSC signals, and said clocking rate which is modulated in accordance with time base errors in said incoming signals is a whole multiple of a chrominance subcarrier frequency for said NTSC signals and is in interleaving relation to the horizontal line frequency for said NTSC signals.

5. A time base corrector according to claim 2; in which means are provided to detect dropout in said incoming signals and, in response thereto, to replace, in said output from said memory, those of said digitized signals representing an even number of said line intervals which include a detected dropout with a repeated read out from one of said memory units of said digitized signals which represent the same even number of line intervals which are free of a detected dropout.

6. A time base corrector according to claim 5; in which said color video signals are NTSC signals having chrominance subcarriers of reversed phases for alternate line intervals thereof, and in which said reversed phases of said chrominance subcarriers for alternate line intervals is preserved in said output from the memory when reconverted to analog form by reason of said storing of an even number of said line intervals in each of said memory units.

* * * * *

UNITED STATES PATENT AND TRADEMARK OFFICE
CERTIFICATE OF CORRECTION

PATENT NO. : 4,081,826
DATED : March 28, 1978
INVENTOR(S) : Takeshi Ninomiya

It is certified that error appears in the above-identified patent and that said Letters Patent are hereby corrected as shown below:

Column 1, line 57, change "and" to --the--.

Column 2, line 12, change "intervals" to --interval--;

line 52, change "number" to --numbers--.

Signed and Sealed this

Tenth Day of October 1978

[SEAL]

Attest:

RUTH C. MASON
*Attesting Officer*

DONALD W. BANNER
*Commissioner of Patents and Trademarks*

UNITED STATES PATENT AND TRADEMARK OFFICE
CERTIFICATE OF CORRECTION

PATENT NO. : 4,081,826
DATED : March 28, 1978
INVENTOR(S) : Takeshi Ninomiya

It is certified that error appears in the above-identified patent and that said Letters Patent are hereby corrected as shown below:

Foreign Application Priority Data

Insert --and Japanese Patent Application No. 50-59449 filed May 19, 1975.--

Signed and Sealed this

Thirty-first Day of July 1979

[SEAL]

Attest:

Attesting Officer

LUTRELLE F. PARKER
*Acting Commissioner of Patents and Trademarks*